United States Patent
Ananda et al.

(10) Patent No.: US 10,809,816 B2
(45) Date of Patent: Oct. 20, 2020

(54) CUSTOMIZABLE ORIENTATION LOCK FOR A MOBILE DISPLAY DEVICE

(71) Applicant: QUALCOMM Incorporated, San Diego, CA (US)

(72) Inventors: Raghavendra Shyam Ananda, Hyderabad (IN); Surendra Kompala, Hyderabad (IN); Naga Chandan Babu Gudivada, Hyderabad (IN); Anand Krishna Puranik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/686,125

(22) Filed: Aug. 24, 2017

(65) Prior Publication Data

US 2019/0064937 A1 Feb. 28, 2019

(51) Int. Cl.
*G06F 3/0346* (2013.01)
*G06F 3/0481* (2013.01)
(Continued)

(52) U.S. Cl.
CPC .......... *G06F 3/0346* (2013.01); *G06F 1/1694* (2013.01); *G06F 3/0481* (2013.01);
(Continued)

(58) Field of Classification Search
CPC .... G06F 3/0346; G06F 3/0484; G06F 1/1694; G06F 2200/1614
See application file for complete search history.

(56) References Cited

U.S. PATENT DOCUMENTS

| 7,428,989 B2 * | 9/2008 | Abboud | G07F 17/3216 |
| | | | 235/375 |
| 8,358,321 B1 * | 1/2013 | Weidner | G09G 5/00 |
| | | | 345/619 |

(Continued)

FOREIGN PATENT DOCUMENTS

| EP | 3 171 242 | * 5/2017 | .......... G06F 3/0488 |
| EP | 3171242 A1 | 5/2017 | |

OTHER PUBLICATIONS

GMEDIA: "Ultimate Rotation Control: Force Auto-Rotate Landscape Mode Applications and HomeScreen", You Tube, Oct. 26, 2015, XP054978648, Retrieved from the Internet: URL:https://www.youtube.com/watch?v=iarf8tkWjAg [retrieved on Aug. 30, 2018], pp. 1-2.

(Continued)

*Primary Examiner* — Phenuel S Salomon
(74) *Attorney, Agent, or Firm* — MG-IP Law, P.C.

(57) ABSTRACT

The disclosure is related to locking an orientation of a display screen of a mobile display device. In an aspect, the mobile display device stores a first local orientation lock associated with a first application, wherein the first local orientation lock specifies a first orientation of the display screen to which the orientation of the display screen is to be set when the first application is displayed on the display screen, receives an instruction to display the first application, determines whether a global orientation lock for the display screen is set, wherein the global orientation lock specifies a global orientation of the display screen to which the orientation of the display screen is to be set, and sets, based on the global orientation lock being set, the orientation of the display screen to the global orientation and displaying the first application on the display screen in accordance with the global orientation.

30 Claims, 6 Drawing Sheets

(51) Int. Cl.
*G06F 1/16* (2006.01)
*G06F 3/0484* (2013.01)

(52) U.S. Cl.
CPC .. *G06F 3/04842* (2013.01); *G06F 2200/1614* (2013.01); *G06F 2200/1637* (2013.01)

(56) References Cited

U.S. PATENT DOCUMENTS

| | | | | |
|---|---|---|---|---|
| 8,717,285 | B1* | 5/2014 | White | G06F 3/0346 345/156 |
| 2003/0085870 | A1* | 5/2003 | Hinckley | G06F 1/1626 345/156 |
| 2005/0114788 | A1* | 5/2005 | Fabritius | G06F 1/1626 715/767 |
| 2009/0085881 | A1* | 4/2009 | Keam | G06F 3/0416 345/173 |
| 2010/0066763 | A1* | 3/2010 | MacDougall | G06F 1/1626 345/656 |
| 2010/0087230 | A1* | 4/2010 | Peh | G06F 3/04817 455/566 |
| 2011/0012926 | A1* | 1/2011 | Kerr | G06F 1/1626 345/649 |
| 2011/0032220 | A1* | 2/2011 | Shih | G06F 1/1694 345/204 |
| 2011/0164066 | A1* | 7/2011 | Beals | G06F 1/1626 345/685 |
| 2012/0223892 | A1* | 9/2012 | Matsubara | G06F 1/1626 345/173 |
| 2013/0082919 | A1* | 4/2013 | Jano | H04M 1/0208 345/156 |
| 2013/0154947 | A1* | 6/2013 | Abrams | G06F 1/1626 345/173 |
| 2013/0162684 | A1* | 6/2013 | Williams | G09G 5/363 345/650 |
| 2013/0265250 | A1* | 10/2013 | Ishikawa | G06F 3/041 345/173 |
| 2014/0078178 | A1* | 3/2014 | Li | G09G 5/00 345/659 |
| 2014/0132514 | A1* | 5/2014 | Kuzara | G06F 1/1647 345/158 |
| 2014/0368441 | A1* | 12/2014 | Touloumtzis | G06F 3/0487 345/173 |
| 2015/0029225 | A1* | 1/2015 | Aigner | G09G 5/38 345/650 |
| 2015/0116232 | A1* | 4/2015 | Hayakawa | G06F 3/0412 345/173 |
| 2015/0154737 | A1* | 6/2015 | McRae | G06F 3/017 345/652 |
| 2015/0378520 | A1* | 12/2015 | Chandrasekaran | G06F 3/0482 715/716 |
| 2019/0064937 | A1* | 2/2019 | Ananda | G06F 1/1694 |

OTHER PUBLICATIONS

International Search Report and Written Opinion—PCT/US2018/039259—ISA/EPO—Sep. 10, 2018.

* cited by examiner

CUSTOMIZABLE ORIENTATION LOCK FOR A MOBILE DISPLAY DEVICE

Aspects of this disclosure relate to a customizable orientation lock for a mobile display device and the like.

Numerous types of mobile display devices (e.g., smartphones, tablet computers, Internet of Things (IoT) devices, digital notepads, electronic readers (e-readers), etc.) have rectangular-shaped display screens that allow content to be displayed in either a "portrait" orientation or a "landscape" orientation. To switch between these two orientations of the display screen, a user can rotate the device from one orientation to another (e.g., from the portrait orientation to the landscape orientation). Sensors within the mobile display device, such as one or more accelerometers, detect the orientation of the device and change the orientation of the display screen to match the orientation of the device.

To prevent inadvertently switching the orientation of the display screen, the user may "lock" the screen orientation (commonly referred to as a "global orientation lock" or "global lock"). However, some applications are better viewed in the landscape orientation (e.g., a video viewing application) while others are better viewed in the portrait orientation (e.g., a note-taking application). With the global orientation lock set, both applications will be displayed in the same orientation. If the user wishes to change the orientation when switching between the applications, the user must manually unlock the display orientation, switch to the other application, rotate the device to the desired orientation, and re-lock the display orientation. This can be tedious and annoying, especially when it occurs in quick succession.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of locking an orientation of a display screen of a mobile display device includes storing, by the mobile display device, a first local orientation lock associated with a first application on the mobile display device, wherein the first local orientation lock specifies a first orientation of the display screen to which the orientation of the display screen is to be set when the first application is displayed on the display screen, receiving, at the mobile display device, an instruction to display the first application, determining, by the mobile display device, whether a global orientation lock for the display screen is set, wherein the global orientation lock specifies a global orientation of the display screen to which the orientation of the display screen is to be set, based on the global orientation lock being set, setting, by the mobile display device, the orientation of the display screen to the global orientation and displaying the first application on the display screen in accordance with the global orientation; and, based on the global orientation lock not being set, setting, by the mobile display device, the orientation of the display screen to the first orientation and displaying the first application on the display screen in accordance with the first orientation.

In an aspect, an apparatus for locking an orientation of a display screen of a mobile display device includes at least one processor configured to store a first local orientation lock associated with a first application on the mobile display device, wherein the first local orientation lock specifies a first orientation of the display screen to which the orientation of the display screen is to be set when the first application is displayed on the display screen, receive an instruction to display the first application, determine whether a global orientation lock for the display screen is set, wherein the global orientation lock specifies a global orientation of the display screen to which the orientation of the display screen is to be set, set, based on the global orientation lock being set, the orientation of the display screen to the global orientation and cause the display screen to display the first application on the display screen in accordance with the global orientation, and set, based on the global orientation lock not being set, the orientation of the display screen to the first orientation and cause the display screen to display the first application on the display screen in accordance with the first orientation.

In an aspect, a non-transitory computer-readable medium storing computer-executable instructions for locking an orientation of a display screen of a mobile display device includes computer-readable instructions comprising at least one instruction instructing the mobile display device to store a first local orientation lock associated with a first application on the mobile display device, wherein the first local orientation lock specifies a first orientation of the display screen to which the orientation of the display screen is to be set when the first application is displayed on the display screen, at least one instruction instructing the mobile display device to receive an instruction to display the first application, at least one instruction instructing the mobile display device to determine whether a global orientation lock for the display screen is set, wherein the global orientation lock specifies a global orientation of the display screen to which the orientation of the display screen is to be set, at least one instruction instructing the mobile display device to set, based on the global orientation lock being set, the orientation of the display screen to the global orientation and to display the first application on the display screen in accordance with the global orientation, and at least one instruction instructing the mobile display device to set, based on the global orientation lock not being set, the orientation of the display screen to the first orientation and to display the first application on the display screen in accordance with the first orientation.

In an aspect, an apparatus for locking an orientation of a means for displaying of a mobile display device includes a means for processing configured to store a first local orientation lock associated with a first application on the mobile display device, wherein the first local orientation lock specifies a first orientation of the means for displaying to which the orientation of the means for displaying is to be set when the first application is displayed on the means for displaying, receive an instruction to display the first application, determine whether a global orientation lock for the means for displaying is set, wherein the global orientation lock specifies a global orientation of the means for displaying to which the orientation of the means for displaying is to be set, set, based on the global orientation lock being set, the orientation of the means for displaying to the global orientation and cause the means for displaying to display the first application on the means for displaying in accordance with the global orientation, and set, based on the global orientation lock not being set, the orientation of the means for displaying to the first orientation and cause the means for displaying to display the first application on the means for displaying in accordance with the first orientation.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The disclosure is related to locking an orientation of a display screen of a mobile display device. In an aspect, the mobile display device stores a first local orientation lock associated with a first application on the mobile display device, wherein the first local orientation lock specifies a first orientation of the display screen to which the orientation of the display screen is to be set when the first application is displayed on the display screen, receives an instruction to display the first application, determines whether a global orientation lock for the display screen is set, wherein the global orientation lock specifies a global orientation of the display screen to which the orientation of the display screen is to be set, sets, based on the global orientation lock being set, the orientation of the display screen to the global orientation and displaying the first application on the display screen in accordance with the global orientation, and sets, based on the global orientation lock not being set, the orientation of the display screen to the first orientation and displaying the first application on the display screen in accordance with the first orientation.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
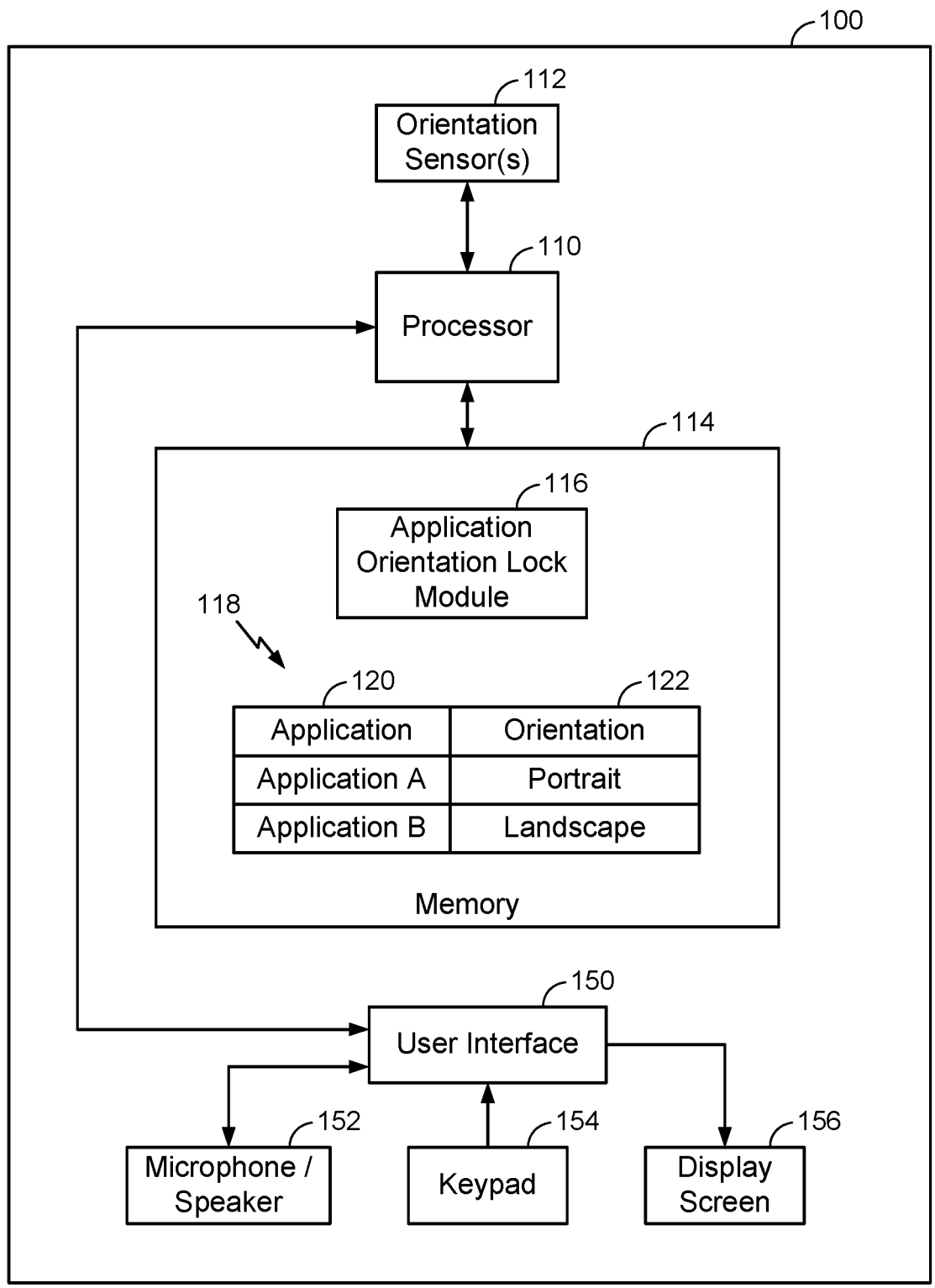
FIG. 1 illustrates an exemplary mobile display device according to at least one aspect of the disclosure.

FIG. 1 is a block diagram illustrating various components of an exemplary mobile display device 100. For the sake of simplicity, the various features and functions illustrated in the box diagram of FIG. 1 are connected together using a common bus that is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 1 may be further subdivided or two or more of the features or functions illustrated in FIG. 1 may be combined.

The mobile display device 100 may include one or more orientation sensors 112 coupled to a processor 110 that provide movement and/or orientation information of the mobile display device 100. By way of example, the one or more orientation sensors 112 may include one or more of an accelerometer (e.g., a microelectromechanical system (MEMS) device), a gyroscope, a geomagnetic sensor (e.g., a compass), an altimeter (e.g., a barometric pressure altimeter), and/or any other type of motion or orientation detection sensor. Moreover, the one or more orientation sensors 112 may include a plurality of different types of sensors that combine their outputs in order to provide orientation information for the mobile display device 100. For example, the one or more orientation sensors 112 may use a combination of one or more accelerometers and a gyroscope to determine whether the mobile display device 100 is positioned in a portrait orientation or a landscape orientation.

The processor 110 may include any form of logic suitable for performing at least the techniques provided herein, such as one or more microprocessors, application specific integrated circuits (ASICs), microcontrollers, field programmable gate arrays (FPGAs), and/or digital signal processors (DSPs) that provide processing functionality, as well as other calculation and control functionality. The processor 110 may also include, or be communicatively coupled to, a memory 114 storing data and software instructions for executing programmed functionality within the mobile display device 100. The memory 114 may be on-board the processor 110 (e.g., within the same integrated circuit (IC) package), and/or the memory 114 may be external to the processor 110 and functionally coupled over a data bus.

A number of software modules and/or data tables may reside in the memory 114 and be utilized by the processor 110 in order to provide the functionality described herein. For example, as will be described further herein, the memory 114 may include an application orientation lock module 116 storing instructions for instructing the processor 110 to perform the functionality described herein. The memory 114 may also include a local orientation lock table 118 storing an association between certain applications (column 120) and a corresponding local orientation lock (column 122). One should appreciate that the organization of the memory contents as shown in FIG. 1 is merely exemplary, and as such, the functionality of the modules and/or data structures may be combined, separated, and/or be structured in different ways depending upon the implementation of the mobile display device 100.

While the modules and tables shown in FIG. 1 are illustrated as being contained in the memory 114, it is recognized that in certain implementations such procedures may be provided for or otherwise operatively arranged using other or additional mechanisms. For example, all or part of the application orientation lock module 116 and/or the local orientation lock table 118 may be provided in firmware. Additionally, while in this example the application orientation lock module 116 and the local orientation lock table 118 are illustrated as being separate features, it is recognized, for example, that such procedures may be combined together as one procedure or perhaps with other procedures, or otherwise further divided into a plurality of sub-procedures.

The mobile display device 100 may include a user interface 150 that provides any suitable interface systems, such as a microphone/speaker 152, keypad 154, and display screen 156 that allows user interaction with the mobile display device 100. The microphone/speaker 152 may provide for voice communication services via the mobile display device 100. The keypad 154 may comprise any suitable buttons for user input. The display screen 156 may be a rectangular-shaped display screen that may rotate between at least two orientations (e.g., portrait and landscape), such as, for example, a backlit liquid crystal display (LCD), a light-emitting diode (LED) display, etc., and may further be a touchscreen display for additional user input modes.

As used herein, the mobile display device 100 may be any portable or movable (e.g., handheld) device or machine that includes a display screen that can rotate between at least two orientation modes (e.g., portrait and landscape), such as a smartphone, a tablet computer, an IoT device, a digital notepad, an e-reader, etc. As shown in FIG. 1, the mobile display device 100 is representative of such a mobile display device.

Figure 2A:
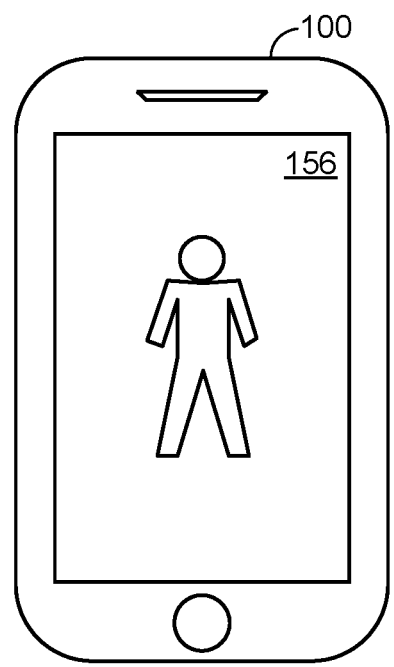
FIGS. 2A and 2B illustrate exemplary orientations of a mobile display device according to at least one aspect of the disclosure.
Figure 2B:
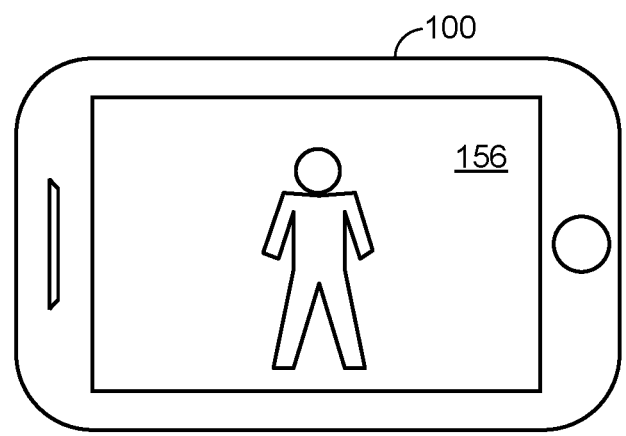

As noted above, the mobile display device 100 has a rectangular-shaped display screen 156 that allows content to be displayed in either a "portrait" orientation (FIG. 2A) or a "landscape" orientation (FIG. 2B). To switch between these two orientations of the display screen 156, a user can rotate the mobile display device 100 from one orientation to another (e.g., from the portrait orientation in FIG. 2A to the landscape orientation in FIG. 2B). The one or more orientation sensors 112 within the mobile display device 100 can detect the orientation of the mobile display device 100 and, as illustrated in FIGS. 2A and 2B, change the orientation of the display screen 156 to match the orientation of the mobile display device 100.

Figure 3A:
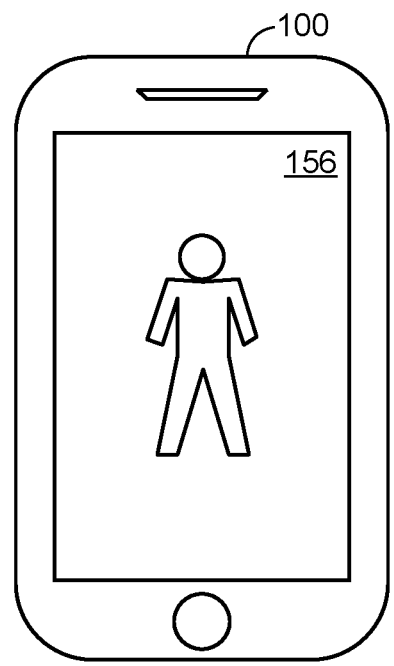
FIGS. 3A and 3B illustrate an example of locking the display screen of a mobile display device according to at least one aspect of the disclosure.
Figure 3B:
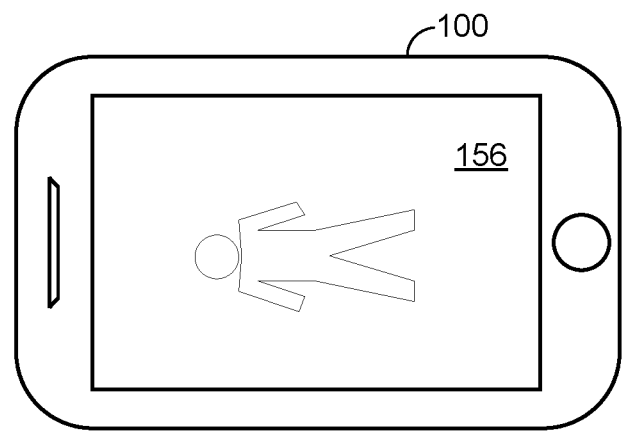

To prevent the orientation of the display screen 156 from changing when the user moves the mobile display device 100, the user may set a "global orientation lock" that sets the orientation of the display screen 156 for all applications running on the mobile display device 100 regardless of the orientation of the mobile display device 100. For example, as illustrated in FIGS. 3A and 3B, the user has locked the orientation of the display screen 156 in the portrait orientation, which forces the orientation of the display screen 156 to remain in portrait mode regardless of the orientation of the mobile display device 100.

However, some applications are better viewed in the landscape orientation (e.g., a video viewing application) while others are better viewed in the portrait orientation (e.g., a note-taking application). With a global orientation lock set, both applications will be displayed in the same orientation. If the user wishes to change the orientation when switching between applications, the user must manually unlock the global orientation lock, switch to the other application, rotate the mobile display device 100 to the desired orientation, and re-set the global orientation lock. This can be tedious and annoying, especially when it occurs in quick succession.

Accordingly, the mobile display device 100 of the present disclosure provides the ability to set local orientation locks for specific applications that may or may not, depending on user preferences, be overridden by the global orientation lock. In an aspect, each application on (e.g., installed or executed on) the mobile display device 100 may be associated with a default local orientation lock set by the developer of the application. Alternatively, only some, or possibly none, of the applications on the mobile display device 100 may be associated with a default local orientation lock. Either way, the user of the mobile display device 100 can also set a local orientation lock for any application he or she wishes, or disable the default local orientation lock (if set) so that there is no local orientation lock associated with an application. Where a default local orientation lock has been set for an application, the user-selected local orientation lock will override the default local orientation lock.

In an aspect, an application may have a setting within the application that permits the user to set the local orientation lock for that application. Alternatively, or additionally, the mobile display device 100 may have a setting that permits the user to set a local orientation lock for any selected or identified application. The local orientation lock table 118 may store the association between an application (column 120) and the corresponding local orientation lock (column 122). Column 120 stores an identifier of the application, such as the application name. In the example of FIG. 1, two applications, Application A and Application B, are shown. However, as will be appreciated, there may be any number of applications in column 120 for which a local orientation lock has been set. The local orientation lock table 118 may have an entry for each application on the mobile display device 100, or only those applications on the mobile display device 100 for which a (default or user-selected) local orientation lock has been set.

Column 122 of the local orientation lock table 118 stores the type of orientation lock (e.g., portrait, landscape, not set (where the local orientation lock table 118 has an entry for each application on the mobile display device 100)) associated with the corresponding application in column 120. In an aspect, the local orientation lock table 118 may include a third column (not shown) indicating whether or not the local orientation lock in column 122 is a default lock or a user-selected lock.

When the user opens or switches to an application, the mobile display device 100 checks column 120 of the local orientation lock table 118 to determine whether the application is listed in the local orientation lock table 118 (where the local orientation lock table 118 does not have an entry for each application on the mobile display device 100). If the application is listed in column 120, the mobile display device 100 switches (if necessary) and locks the orientation of the display screen 156 to the orientation indicated in column 122. When the user opens or switches to a different application, the mobile display device 100 again checks column 120 of the local orientation lock table 118 to determine whether the second application is listed in the local orientation lock table 118 (where the local orientation lock table 118 does not have an entry for each application on the mobile display device 100). If the second application is listed in column 120, the mobile display device 100 switches (if necessary) and locks the orientation of the display screen 156 to the orientation indicated in column 122.

In an aspect, the user may also set a global orientation lock. If the user has set a global orientation lock and the active application is associated with a local orientation lock (either default or user-selected), there are two options for which orientation lock (the global orientation lock or the local orientation lock) should be applied. First, the global orientation lock can override the local orientation lock. This option may be beneficial if there are applications associated with default local orientation locks that the user wishes to override but cannot, or at the moment prefers not to, override with a user-selected local orientation lock. This option will prevent the orientation of the display screen 156 from potentially changing each time the user switches applications due to local orientation locks.

Second, the local orientation lock can override the global orientation lock. This option may be beneficial if the user wants the global orientation lock to apply to all applications except the specific applications for which a local orientation lock has been set. This may be the case when there are very few, if any, local orientation locks, as the display screen 156 will change orientation infrequently when the global orientation lock is set. A goal of both options is to prevent the orientation of the display screen 156 from changing too frequently, as this can be annoying to the user experience. Additionally, both options give the user greater control to enforce his or her preferences regarding how content is displayed on the mobile display device 100. The user may select which option should be applied in the settings of an application or the mobile display device 100.

Figure 4A:
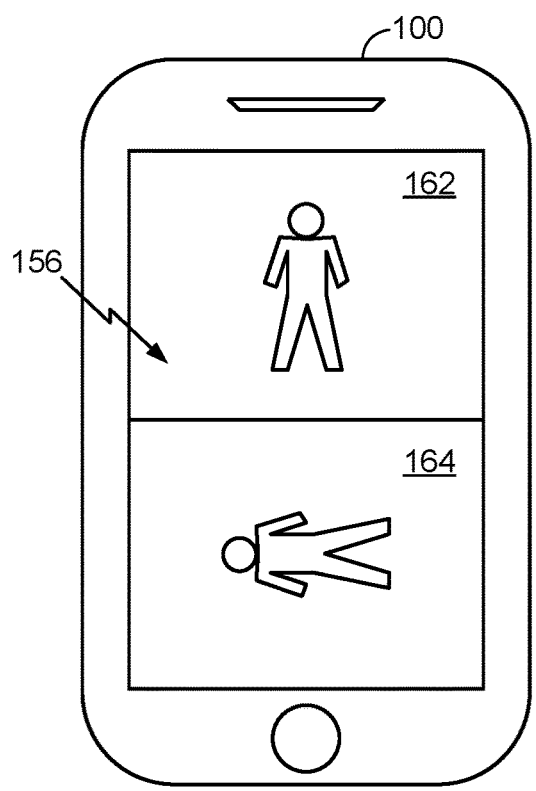
FIGS. 4A and 4B illustrate an example of a split screen display of a mobile display device according to at least one aspect of the disclosure.

The aspects disclosed herein may also be beneficial when the mobile display device 100 is operating in a split screen mode. Where the local orientation locks override the global orientation lock (first option), the orientation of each application in the split screen of display screen 156 will be set according to the respective local orientation lock. For example, as shown in FIG. 4A, the mobile display device 100 is positioned in a portrait orientation, while a first portion 162 of the display screen 156 is oriented in a landscape mode and a second portion 164 of the display screen 156 is oriented in a portrait mode. The landscape and portrait orientations of the first and second portions 162 and 164 of the display screen 156 are determined by the local orientation locks associated with the applications active in those portions of the display screen 156, not the orientation of the mobile display device 100 or a global orientation lock.

Figure 4B:
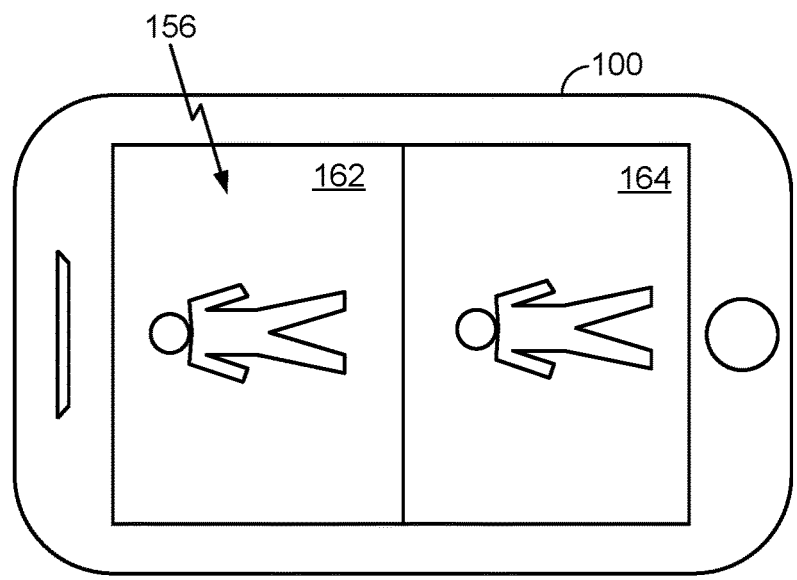

In contrast, where the global orientation lock overrides the local orientation locks (second option), the orientation of each application in the split screen of display screen 156 will be set according to the global orientation lock. For example, as shown in FIG. 4B, the mobile display device 100 is positioned in a landscape orientation, and both the first portion 162 of the display screen 156 and the second portion 164 of the display screen 156 are oriented in a landscape mode. The landscape orientations of the first and second portions 162 and 164 of the display screen 156 are determined by the global orientation lock, not the orientation of the mobile display device 100 or local orientation locks associated with the applications active in those portions of the display screen 156.

Although FIGS. 4A and 4B illustrate only two screen portions, as will be appreciated, the techniques described herein are applicable to any number of screen portions (e.g., three, four, etc.).

Figure 5:
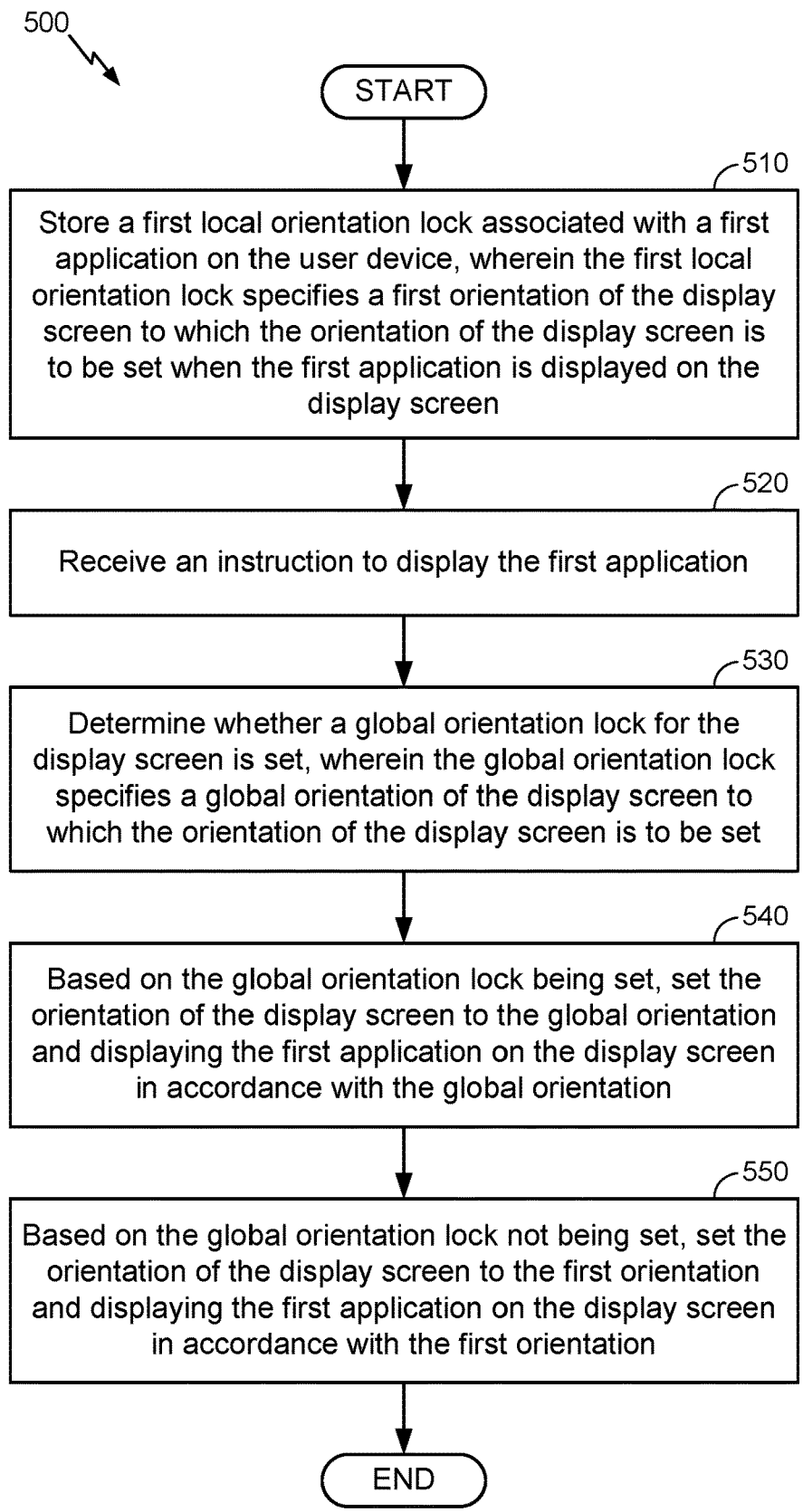
FIG. 5 illustrates an exemplary method of locking an orientation of the display screen of a mobile display device according to at least one aspect of the disclosure.

FIG. 5 illustrates an exemplary method 500 of locking an orientation of the display screen 156 of the mobile display device 100 according to at least one aspect of the disclosure.

At 510, the mobile display device 100 (e.g., the processor 110 as instructed by executing the application orientation lock module 116) stores a first local orientation lock associated with a first application on the mobile display device 100. For example, the mobile display device 100 may store the first local orientation lock and an identifier of the first application in the local orientation lock table 118. The first orientation lock may be a local orientation lock, and as such, specifies a first orientation of the display screen 156 to which the orientation of the display screen 156 is to be set when the first application is displayed on the display screen 156.

At 520, the mobile display device 100 (e.g., the processor 110 via the user interface 150) receives an instruction to display the first application. In an aspect, the instruction to display the first application may be an instruction to switch from displaying a second application to displaying the first application. In another aspect, the instruction to display the first application may be an instruction to launch the first application.

At 530, the mobile display device 100 (e.g., the processor 110 as instructed by executing the application orientation lock module 116) determines whether a global orientation lock for the display screen 156 is set. As discussed above, the global orientation lock specifies a global orientation of the display screen 156 to which the orientation of the display screen 156 is to be set;

At 540, based on the global orientation lock being set, the mobile display device 100 sets (e.g., the processor 110 and the user interface 150 as instructed by executing the application orientation lock module 116) the orientation of the display screen 156 to the global orientation and displays the first application on the display screen 156 in accordance with the global orientation.

At 550, based on the global orientation lock not being set, the mobile display device 100 (e.g., the processor 110 and the user interface 150 as instructed by executing the application orientation lock module 116) sets the orientation of the display screen 156 to the first orientation and displays the first application on the display screen 156 in accordance with the first orientation.

Figure 6:
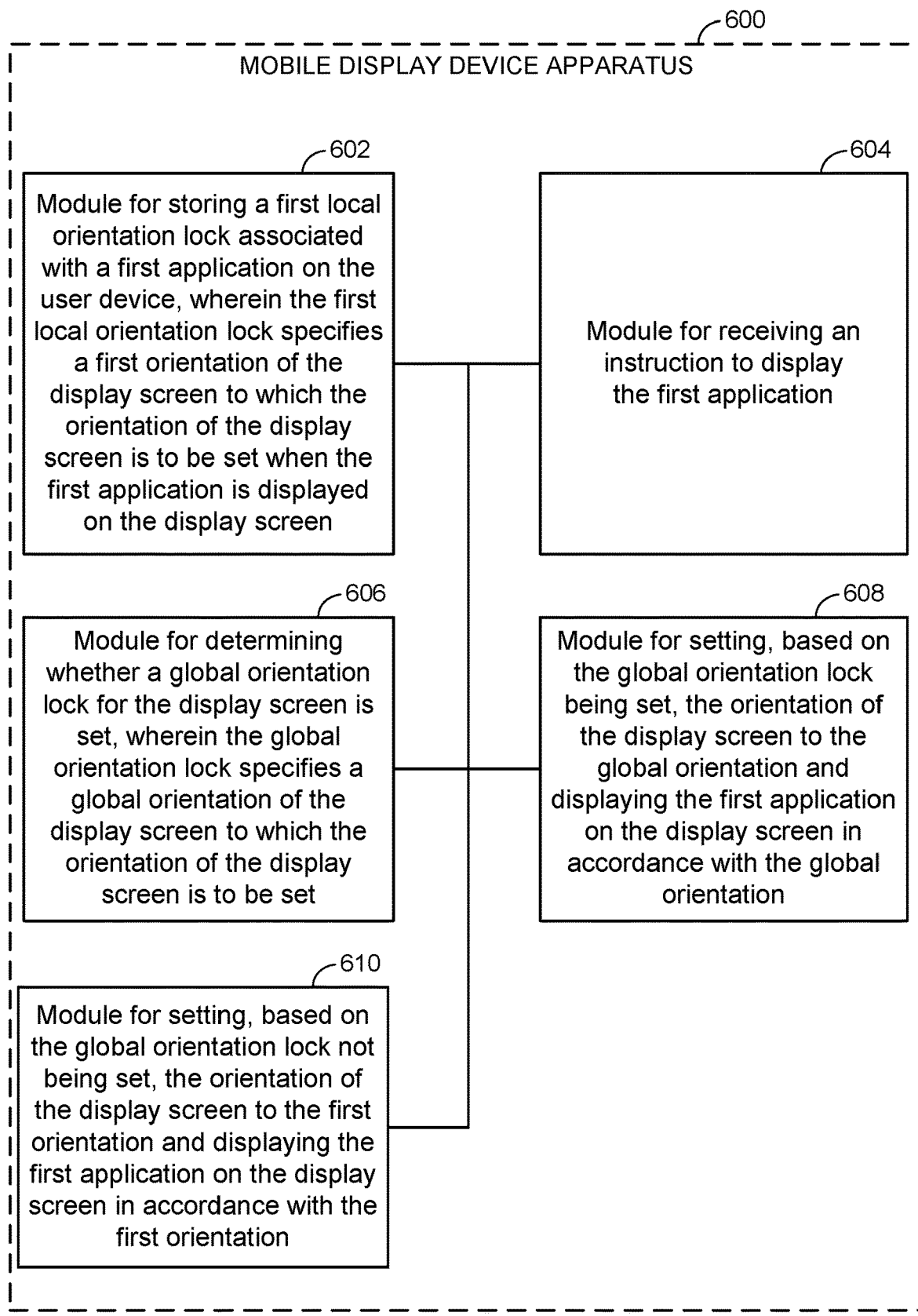
FIG. 6 is a simplified block diagram of several sample aspects of an apparatus configured to support the functionality disclosed herein.

FIG. 6 illustrates an example mobile display device apparatus 600 (which may correspond to the mobile display device 100) represented as a series of interrelated functional modules. A module for storing 602 may correspond at least in some aspects to, for example, a processing system, such as processor 110, in conjunction with a storage device, such as memory 114, as discussed herein. A module for receiving 604 may correspond at least in some aspects to, for example, a processing system, such as processor 110, in conjunction with a user interface, such as user interface 150, as discussed herein. A module for determining 606 may correspond at least in some aspects to, for example, a processing system, such as processor 110, as discussed herein. A module for setting 608 may correspond at least in some aspects to, for example, a processing system, such as processor 110, in conjunction with a user interface, such as user interface 150, as discussed herein. A module for setting 610 may correspond at least in some aspects to, for example, a processing system, such as processor 110, in conjunction with a user interface, such as user interface 150, as discussed herein.

The functionality of the modules 602-610 of FIG. 6 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for locking an orientation of the display screen 156 of the mobile display device 100.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of locking an orientation of a display screen of a mobile display device, comprising:
storing, by the mobile display device, a first local orientation lock associated with a first application on the mobile display device, wherein the first local orientation lock specifies a first orientation of the display screen to which the orientation of the display screen is to be set when the first application is displayed on the display screen;
receiving, at the mobile display device, an instruction to display the first application;
determining, by the mobile display device, whether a global orientation lock for the display screen is set, wherein the global orientation lock specifies a global orientation of the display screen to which the orientation of the display screen is to be set for all applications displayed on the mobile display device;
based on the global orientation lock being set, setting, by the mobile display device, the orientation of the display screen to the global orientation and displaying the first application on the display screen in accordance with the global orientation; and based on the global orientation lock not being set, setting, by the mobile display device, the orientation of the display screen to the first orientation and displaying the first application on the display screen in accordance with the first orientation.

2. The method of claim 1, wherein the first local orientation lock comprises a default orientation lock associated with the first application.

3. The method of claim 2, wherein the default orientation lock is based on a type of the first application.

4. The method of claim 1, wherein the first local orientation lock comprises a user-selected orientation lock for the first application.

5. The method of claim 1, wherein the instruction to display the first application comprises an instruction to switch from displaying a second application to displaying the first application.

6. The method of claim 1, wherein the instruction to display the first application comprises an instruction to launch the first application.

7. The method of claim 1, further comprising:
receiving a selection of the global orientation lock via a user interface of the mobile display device to override local orientation locks.

8. The method of claim 1, further comprising:
storing, by the mobile display device, a second local orientation lock associated with a second application on the mobile display device, wherein the second local orientation lock specifies a second orientation of the display screen to which the orientation of the display screen is to be set when the second application is displayed on the display screen.

9. The method of claim 8, wherein the displaying the first application on the display screen in accordance with the first orientation comprises displaying the first application in a first portion of the display screen in accordance with the first orientation, the method further comprising:
displaying, by the mobile display device, the second application in a second portion of the display screen simultaneously with displaying the first application in the first portion of the display screen, wherein an orientation of the second portion of the display screen is set to the second orientation.

10. The method of claim 8, wherein the displaying the first application on the display screen in accordance with the global orientation comprises displaying the first application in a first portion of the display screen in accordance with the global orientation, the method further comprising:
displaying, by the mobile display device, the second application in a second portion of the display screen simultaneously with displaying the first application in the first portion of the display screen; and
based on the global orientation lock being set, setting, by the mobile display device, an orientation of the second portion of the display screen to the global orientation and displaying the second application on the second portion of the display screen in accordance with the global orientation.

11. The method of claim 1, wherein each application on the mobile display device is associated with a respective local orientation lock.

12. The method of claim 1, wherein setting the orientation of the display screen to the global orientation based on the global orientation lock being set is based on a preference set by a user of the mobile display device.

13. The method of claim 1, wherein the mobile display device comprises a smartphone, a tablet computer, and Internet of Things (IoT) device, a digital notepad, or an electronic reader.

14. An apparatus for locking an orientation of a display screen of a mobile display device, comprising:
at least one processor configured to:
store a first local orientation lock associated with a first application on the mobile display device, wherein the first local orientation lock specifies a first orientation of the display screen to which the orientation of the display screen is to be set when the first application is displayed on the display screen;
receive an instruction to display the first application;
determine whether a global orientation lock for the display screen is set, wherein the global orientation lock specifies a global orientation of the display screen to which the orientation of the display screen is to be set for all applications displayed on the mobile display device;
set, based on the global orientation lock being set, the orientation of the display screen to the global orientation and cause the display screen to display the first application on the display screen in accordance with the global orientation; and
set, based on the global orientation lock not being set, the orientation of the display screen to the first orientation and cause the display screen to display the first application on the display screen in accordance with the first orientation.

15. The apparatus of claim 14, wherein the first local orientation lock comprises a default orientation lock associated with the first application.

16. The apparatus of claim 15, wherein the default orientation lock is based on a type of the first application.

17. The apparatus of claim 14, wherein the first local orientation lock comprises a user-selected orientation lock for the first application.

18. The apparatus of claim 14, wherein the instruction to display the first application comprises an instruction to switch from displaying a second application to displaying the first application.

19. The apparatus of claim 14, wherein the instruction to display the first application comprises an instruction to launch the first application.

20. The apparatus of claim 14, wherein the at least one processor is further configured to:
receive a selection of the global orientation lock via a user interface of the mobile display device to override local orientation locks.

21. The apparatus of claim 14, wherein the at least one processor is further configured to:
store a second local orientation lock associated with a second application on the mobile display device, wherein the second local orientation lock specifies a second orientation of the display screen to which the orientation of the display screen is to be set when the second application is displayed on the display screen.

22. The apparatus of claim 21, wherein the at least one processor being configured to cause the display screen to display the first application on the display screen in accordance with the first orientation comprises the at least one processor being configured to cause the display screen to display the first application in a first portion of the display screen in accordance with the first orientation, wherein the at least one processor is further configured to cause the display screen to display the second application in a second portion of the display screen simultaneously with display of the first application in the first portion of the display screen, wherein an orientation of the second portion of the display screen is set to the second orientation.

23. The apparatus of claim 21, wherein the at least one processor being configured to cause the display screen to display the first application on the display screen in accordance with the global orientation comprises the at least one processor being configured to cause the display screen to display the first application in a first portion of the display screen in accordance with the global orientation,
   wherein the at least one processor is further configured to:
      cause the display screen to display the second application in a second portion of the display screen simultaneously with display of the first application in the first portion of the display screen; and
      based on the global orientation lock being set, set an orientation of the second portion of the display screen to the global orientation and cause the display screen to display the second application on the second portion of the display screen in accordance with the global orientation.

24. The apparatus of claim 14, wherein each application on the mobile display device is associated with a respective local orientation lock.

25. The apparatus of claim 14, wherein the at least one processor being configured to set the orientation of the display screen to the global orientation based on the global orientation lock being set is based on a preference set by a user of the mobile display device.

26. The apparatus of claim 14, wherein the mobile display device comprises a smartphone, a tablet computer, and Internet of Things (IoT) device, a digital notepad, or an electronic reader.

27. A non-transitory computer-readable medium storing computer-executable instructions for locking an orientation of a display screen of a mobile display device, the computer-executable instructions comprising:
   at least one instruction instructing the mobile display device to store a first local orientation lock associated with a first application on the mobile display device, wherein the first local orientation lock specifies a first orientation of the display screen to which the orientation of the display screen is to be set when the first application is displayed on the display screen;
   at least one instruction instructing the mobile display device to receive an instruction to display the first application;
   at least one instruction instructing the mobile display device to determine whether a global orientation lock for the display screen is set, wherein the global orientation lock specifies a global orientation of the display screen to which the orientation of the display screen is to be set for all applications displayed on the mobile display device;
   at least one instruction instructing the mobile display device to set, based on the global orientation lock being set, the orientation of the display screen to the global orientation and to display the first application on the display screen in accordance with the global orientation; and
   at least one instruction instructing the mobile display device to set, based on the global orientation lock not being set, the orientation of the display screen to the first orientation and to display the first application on the display screen in accordance with the first orientation.

28. The non-transitory computer-readable medium of claim 27, further comprising:
   at least one instruction instructing the mobile display device to store a second local orientation lock associated with a second application on the mobile display device, wherein the second local orientation lock specifies a second orientation of the display screen to which the orientation of the display screen is to be set when the second application is displayed on the display screen.

29. The non-transitory computer-readable medium of claim 28, wherein the at least one instruction instructing the mobile display device to display the first application on the display screen in accordance with the global orientation comprises at least one instruction instructing the mobile display device to display the first application in a first portion of the display screen in accordance with the global orientation, the computer-executable instructions further comprising:
   at least one instruction instructing the mobile display device to display the second application in a second portion of the display screen simultaneously with display of the first application in the first portion of the display screen; and
   at least one instruction instructing the mobile display device to set, based on the global orientation lock being set, an orientation of the second portion of the display screen to the global orientation and to display the second application on the second portion of the display screen in accordance with the global orientation.

30. An apparatus for locking an orientation of a means for displaying of a mobile display device, comprising:
   a means for processing configured to:
      store a first local orientation lock associated with a first application on the mobile display device, wherein the first local orientation lock specifies a first orientation of the means for displaying to which the orientation of the means for displaying is to be set when the first application is displayed on the means for displaying;
      receive an instruction to display the first application;
      determine whether a global orientation lock for the means for displaying is set, wherein the global orientation lock specifies a global orientation of the means for displaying to which the orientation of the means for displaying is to be set for all applications displayed on the mobile display device;
      set, based on the global orientation lock being set, the orientation of the means for displaying to the global orientation and cause the means for displaying to display the first application on the means for displaying in accordance with the global orientation; and
      set, based on the global orientation lock not being set, the orientation of the means for displaying to the first orientation and cause the means for displaying to display the first application on the means for displaying in accordance with the first orientation.

* * * * *